United States Patent

Padula

[11] Patent Number: 5,120,168
[45] Date of Patent: Jun. 9, 1992

[54] AUTO-TORQUE, TAMPER-PROOF SCREW/BOLT

[76] Inventor: William V. Padula, 11176 55th Ave N., Seminole, Fla. 34642

[21] Appl. No.: 737,435

[22] Filed: Jul. 29, 1991

Related U.S. Application Data

[63] Continuation-in-part of Ser. No. 623,676, Dec. 6, 1990, abandoned.

[51] Int. Cl.[5] .................. F16B 31/00; F16B 33/04
[52] U.S. Cl. .................................... 411/5; 411/910
[58] Field of Search ........................... 411/1-5, 411/405, 910, 911

[56] References Cited

U.S. PATENT DOCUMENTS

| | | | |
|---|---|---|---|
| 1,243,799 | 10/1917 | Bissell | 411/910 |
| 4,225,165 | 9/1980 | Kesselman | 411/910 |

FOREIGN PATENT DOCUMENTS

| | | | |
|---|---|---|---|
| 2353751 | 5/1975 | Fed. Rep. of Germany | 411/3 |
| 2519854 | 11/1976 | Fed. Rep. of Germany | 411/3 |
| 2727949 | 1/1978 | Fed. Rep. of Germany | 411/910 |
| 3738409 | 5/1984 | Fed. Rep. of Germany | 411/5 |
| 1437383 | 5/1976 | United Kingdom | 411/3 |
| 2232218 | 12/1990 | United Kingdom | 411/910 |

*Primary Examiner*—Neill R. Wilson
*Attorney, Agent, or Firm*—Walter J. Monacelli

[57] ABSTRACT

A fastener, such as a machine screw or bolt, designed with a double head, one located above the other, which when tightened by means of the upper head will, when tightened to a specifically desired amount of inch or foot pounds of torque, over the amount of torque required to apply the main part of the fastener to the desired degree of tightness will shear the upper head from the lower head, automatically torquing no more than desired. The lower head has a conical shape so as to provide a minimum surface to preclude removal by gripping with pliers, a wrench, or screwdriver. This is effected by having the angle between the surface of the cone and the base of the cone advantageously no more than 35°, preferably no more than 30° or less. This ultimately provides a tamper-proof fastener with total automatic torquing capabilities.

8 Claims, 4 Drawing Sheets

AUTO-TORQUE, TAMPER-PROOF SCREW/BOLT

This application is a continuation-in-part of application Ser. No. 07/623,676 filed Dec. 6, 1990, now abandoned.

BACKGROUND OF THE INVENTION

1. Field of the Invention

This invention relates to a machine bolt or screw which when implanted will automatically prevent stripping or damaging of engaged threaded parts and will, after installation, become and remain tamper-proof. More specifically it relates to a double-headed machine screw or bolt, one slotted, shaped or socketed head located above a tapered head.

Still more specifically, it relates to a double-headed machine screw or bolt, which when torqued to its maximum tightness, will cause the slotted head to automatically shear and break free at the narrow neck, at a desired and predetermined force (pounds per square inch), to preclude damaging the engaged screw threads. This auto-torque function will be accomplished during its manufacturing process. The breaking point of the narrow neck will be accomplished by three design factors: (1) The strength of the material from which the screw or bolt is made; (2) The diameter (thickness) of the narrow neck; (3) The predetermined amount of torque required to shear the narrow neck prior to causing damage to the engaged threaded parts, thereby automatically self-torquing its objective and in turn, eliminating the need for torque wrenches, slip-type ratchet tools or slip-clutch power tools. Thus the basis for the "Auto-Torque" portion of the two-part title of this invention.

Still, and even more specifically, it relates to a double-headed screw or bolt, which when more than the required torque is applied to position it tightly in place, will shear the narrow neck between the slotted and tapered heads, leaving a tamper-proof fastener securely in place, having no gripping surface or configuration to facilitate its removal.

2. State of the Prior Art

Manufacturing requirements, and the needs of these times, have dictated the need for a screw-type fastener that, when installed, cannot be over-tightened, thus preventing damage to pertinent threaded parts and, after being installed, cannot be removed in the usual manner, thus rendering it self-torquing and tamper-proof.

During prosecution of the parent application a number of references were cited to show related devices. These include Bissell U.S. Pat. No. 1,243,799; British Patent No. 1,437,383; and German Patents Nos. 2,353,751; 2,519,854 and primarily 3,738,409. German Patent No. 3,738,409 (Meyer) was relied on for rejection. However none of the patents, including Meyer, show the sharp conical angle of applicant's device which makes it impossible to gain a gripping surface. Still further, none of the patents cited as related devices have the additional automatic, self-torquing function that prevents over-tightening and precludes the possibility of damaging the pertinent threaded parts.

SUMMARY OF THE INVENTION

The device of this invention is an ingeniously designed screw-type fastener, having two heads, one located above the other and connected to each other by a narrow neck, with the upper head being any of the standard type of machine-screw head, or, machine-bolt head. However, beneath the upper standard type head there is a narrow connecting neck that is intentionally designed to break upon experiencing a predetermined torque. The breaking point of the narrow neck will depend on three design factors: the strength of the material from which the auto-torque, tamper-proof screw of this invention is made, the thickness of the narrow neck, and the predetermined amount of torque the narrow neck will withstand during installation. The predetermined amount of torque that the narrow neck will withstand will be intentionally varied to suit a manufacturer's or user's requirement by varying the strength of the material from which the auto-torque portion of this invention is made, plus varying the diameter of the narrow neck. Because the field of metallurgy technology has so greatly expanded, the number and the quality of metals and metal alloys, the variations of the strengths of materials to be used in its manufacturing process, and in conjunction with the variations of the diameter of the narrow neck are innumerable. However, the following data and example is provided to clarify the auto-torque function of this invention. Innumerable variations of these design factors can be planned to meet any manufacturer's requirements. Beneath the narrow neck is a tapered head having a threaded shank below, all of which form the invention. The tapered head is designed and shaped to properly perform its fastening function, but is intentionally tapered as a cone and left void of any slotted or socketed configuration in order to defeat any attempt of removal by conventional means, once installed, and after the slotted-type head has been torqued free and discarded.

Thus through the practice of this invention, a screw-type fastener is provided and because of its characteristics and configuration will effectively self-torque to preclude the possibility of damaging the pertinent threaded engaged parts and will when installed provide a fastener that is tamper-proof, defeating removal by conventional methods.

BRIEF DESCRIPTION OF THE DRAWINGS

The description of the invention is facilitated by reference to the drawings.

DESCRIPTION OF THE PREFERRED EMBODIMENTS

Figure 1:
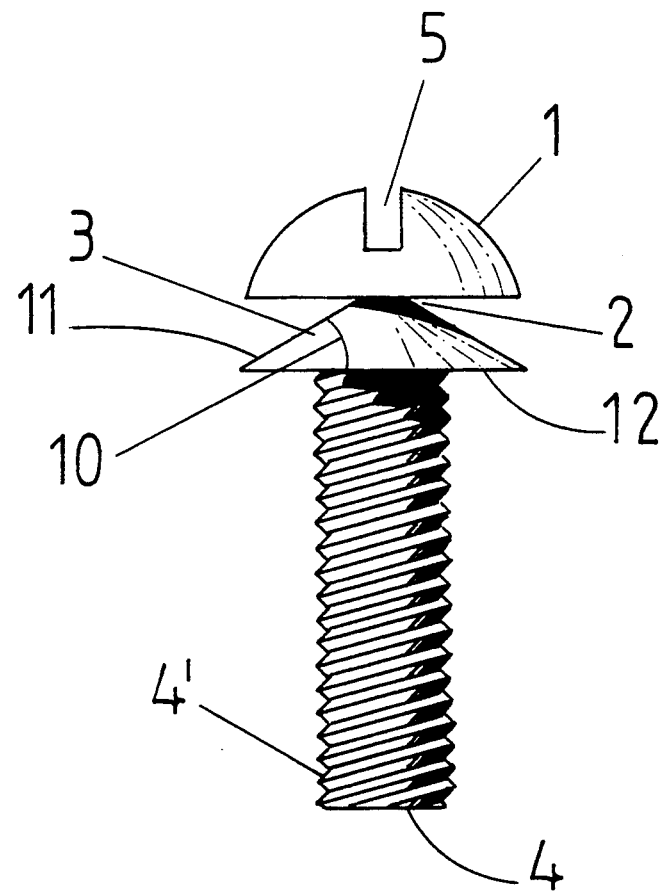
FIG. 1 is an elevational front view of a preferred modification of this invention.

In the preferred embodiment shown in FIG. 1, the auto-torque tamper-proof screw 4 has threaded shaft 4' and has at one end thereof conical head 3 which is connected by narrow neck 2 to head 1 which is (as shown above) on tapered head 3. Slot 5 is positioned in head 1 to permit the use of a screwdriver to apply torque for the turning of head 1 and simultaneously threaded shaft 4. Other means may be embodied in head 1, such as a recessed square, crossed or hexagonal socket-type configuration, by which a respective wrench or key may be used to apply torque for turning head 1. An important feature is angle 10 between the conical surface 11 and the bottom 12 of the tapered head. This sharp angle is advantageously less than 35°, preferably no more than 30°. This angle is preferably in the range of 15° to 30°. The sharp angle makes it impossible to grip the surface with a pair of pliers or similar gripping device.

EXAMPLES & DATA

Figure 5:
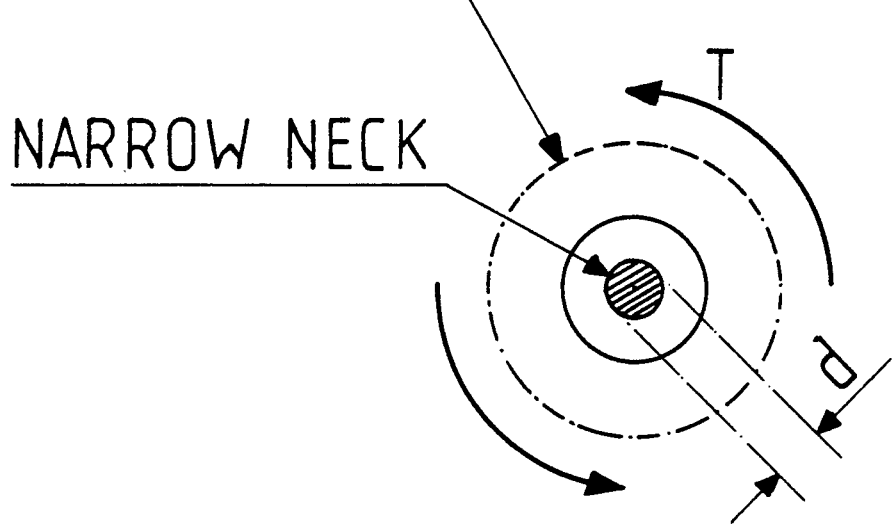
FIG. 5 is a top plan view cross-sectional through the narrow neck beneath a slotted screw head.

To clarify the auto-torque function and the limited break-point of the narrow neck, some examples of comparable values of torques are given. FIG. 5 illustrates the area of the narrow neck (cross-hatched) located beneath the slotted screw head (phantom line). A screwdriver is employed to torque the screw, driving it into the engaged part, setting the tapered head against the engaged part. When more torque is applied than the narrow neck is designed to withstand, the narrow neck will break at only the desired torque and forces required to shear the narrow neck, based on assumed areas and materials, are herein presented.

In referring to this angle it may be stated that the angle may also be described as that formed when an imaginary plane is passed through the apex of the cone (or completed cone) and also through the center of the base of the cone. This plane will intersect the conical surface and the base of the cone to give two lines of intersection. The angle between these two lines is the angle referred to as the angle between the conical surface and the base of the cone.

Figure 2:
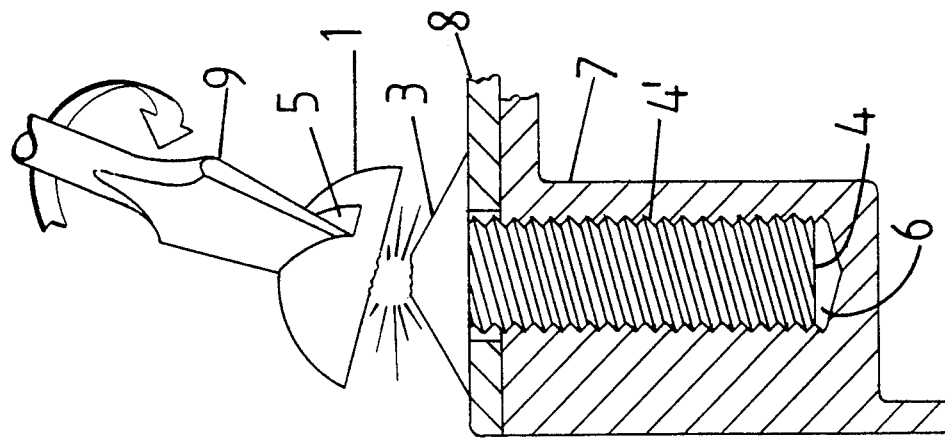
FIG. 2 is a similar view of the modification of FIG. 1 shown partially threaded into a threaded opening.

In FIG. 2, the threaded shaft 4' of screw or bolt 4 is threaded part way into opening 6 of base 7. Screwdriver 9 is inserted into slot 5 to enable torque to be applied for the turning of head 1 and simultaneously with it the threaded shaft 4' of screw or bolt 4. Threaded opening 6 is in base 7 which has upper surface 8.

Figure 3:
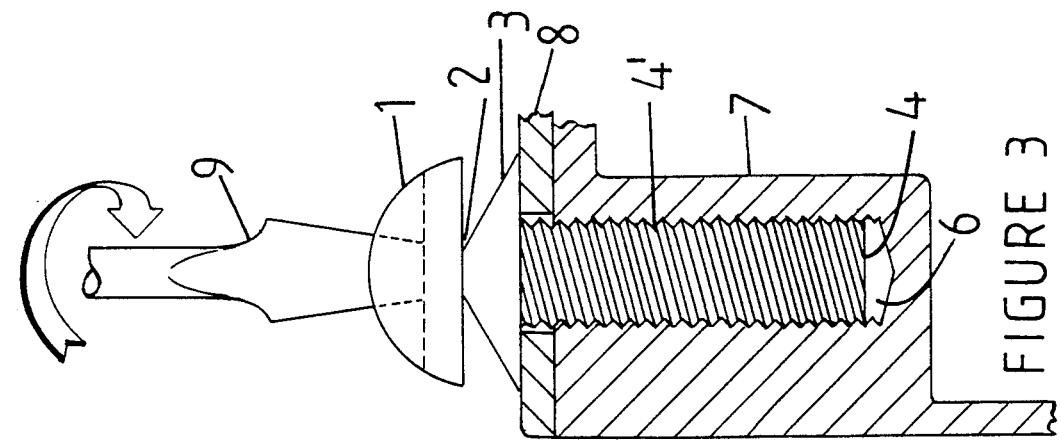
FIG. 3 is a similar view of the modification of FIG. 1 completely threaded into the said opening.

FIG. 3 shows threaded shaft 4' advanced completely into opening 6 and the bottom of head 3 is flush with surface 8.

Figure 4:
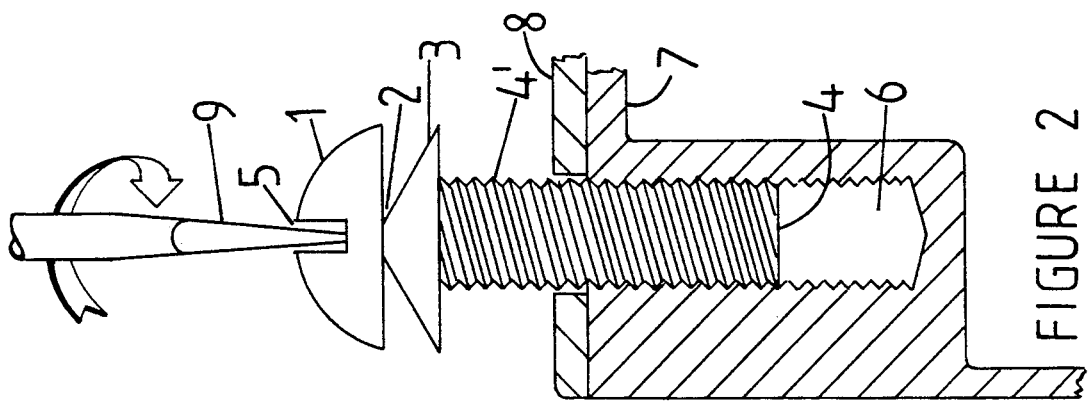
FIG. 4 is a view similar to that of FIG. 3 in which continued application of torque to the upper head of the screw has stripped the upper head off of the lower head.

FIG. 4 shows that continued torque applied in turning head 1 results in the shearing of head 1 from tapered head 3. The sharp angle of the tapered side of the cone-shaped head 3 with the bottom of head 3 makes it difficult and even impossible to apply torque to head 3 for turning it and bolt shaft 4'. This makes the screw tamper-proof after head 1 has been stripped from tapered head 3.

Figure 6:
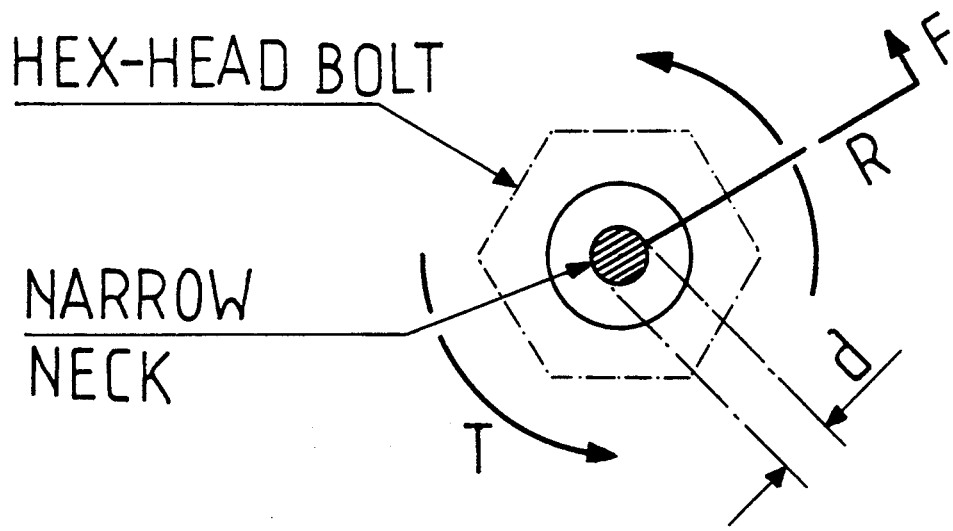
FIG. 6 is a similar view as in FIG. 5 for the narrow neck beneath a hex-head bolt.

FIG. 6 illustrates the area of the narrow neck (cross-hatched) located beneath a hex-head bolt (phantom line). A wrench is employed to torque the hex-head bolt. The length of the wrench is depicted as 'R' above, and is used to supply the required force at a set distance perpendicular to the center of the narrow neck to exert the required torque, driving the bolt into the engaged part, setting the tapered head against the engaged part. When more torque is applied than the narrow neck is designed to withstand, the narrow neck will break at only the desired torque.

The amount of torque exerted on a solid area (narrow neck), as shown in FIGS. 5 and 6, is derived from the following formulae:

In FIG. 5, $$\text{Torque } T = S \times \frac{\pi d^3}{16} \text{ inch pounds}$$

In FIG. 6, $$\text{Torque } T = F \times R$$
$$T = S \times A \times G$$
$$T = S \times \frac{\pi d^2}{4} \times \frac{d}{4}$$

LEGEND OF SYMBOLS USED

Figure 7:
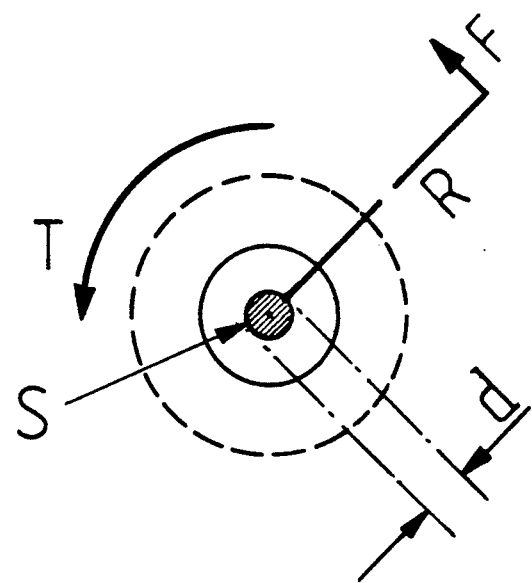
FIG. 7 is a diagram showing how the break-off torques are determined.

T—is the torque in inch pounds
F—is the force in inch pounds
R—is the distance between the force F and the center of the narrow neck in inches (R is (6) inches in Example B).
A—is the area of the solid narrow neck in square inches,
G—is the radius of gyration in inches.
d—is the diameter of the narrow neck in inches.
(P1)—is the ratio of the circumference of a circle to its diameter. It is a non-dimensional constant.
S—is the ultimate shear stress of the material in pounds per square inch. The ultimate shear stresses for the materials considered in the above examples are assumed values and are comparable to commercial grades of similar materials. The assumed shear stress values are:
Steel = 22,000 psi
Brass = 20,000 psi
Aluminum = 16,800 psi To present examples of the ultimate torque "T" and the force "F" to generate the torque as in Example B, values for these were calculated by use of the above formulae for different narrow neck diameters and the assumed ultimate shear strength of steel, brass and aluminum. The values thus obtained are presented in the following table. To obtain the values in the tables an example of the calculations follows:

In FIG. 7

Assumed
d = ⅛ inch = 0.125 inch
R = 6 inches
S = 22,000 PSI (for steel)

Break-Off Torque $T = S \times \frac{\pi d^3}{16} = \frac{22,000 \times 3.1416 \times 0.125^3}{16}$ $T = 8.435$ inch pounds Break-Off Force $F = T/R = \frac{8.435}{6} = 1.406$ pounds

TORQUE & FORCE TABLE
EXAMPLES OF TORQUES AND FORCES

-continued

| DIAM. OF THE NARROW NECK d - INCHES | REQUIRED TO BREAK THE NARROW NECK | | | | | |
|---|---|---|---|---|---|---|
| | STEEL 22,000 PSI | | BRASS 20,000 PSI | | ALUMINUM 16,800 PSI | |
| | TORQUE | FORCE | TORQUE | FORCE | TORQUE | FORCE |
| 1/16 | 1 | 0.2 | 1 | 0.2 | 0.8 | 0.1 |
| 1/8 | 8 | 1.4 | 8 | 1.4 | 6 | 1.1 |
| 3/16 | 28 | 4.7 | 26 | 4.3 | 22 | 3.6 |
| 1/4 | 67 | 11.2 | 61 | 10.2 | 52 | 8.6 |
| 5/16 | 132 | 22.0 | 120 | 20.0 | 101 | 16.7 |
| 3/8 | 228 | 38.0 | 207 | 34.5 | 174 | 29.0 |
| 7/16 | 362 | 60.3 | 329 | 54.8 | 276 | 46.0 |
| 1/2 | 540 | 90.0 | 491 | 81.8 | 412 | 68.7 |

The values for the break-off torques and forces in the above table are obtained on the basis of assumed values of the narrow neck and the material strengths—and are to be considered as examples only to illustrate the theory of the auto-torque, tamper-proof concept. For specific and ultra applications of this fastener concept, detailed analysis with exact values of the narrow neck and materials plus subsequent testing will be essential to facilitate mass production.

As stated above, self-torquing aspect or feature of this invention may be varied or controlled by selecting material of appropriate strength, and the diameter of the connecting neck between the upper and lower heads. In other words the "self-torquing" means the amount of torque required to shear the neck between the two heads. By applying or exceeding this torque the upper head will be sheared from the lower head leaving the tamper-proof lower head securely in place.

While certain features of this invention have been described in detail with respect to various embodiments thereof, it will of course be apparent that other modifications can be made within the spirit and scope of this invention, and it is not intended to limit the invention to the exact details insofar as they are defined in the following claims.

The invention claimed is:

1. A tamper-proof, self-torquing screw comprising:
  (a) a threaded shaft;
  (b) a first head attached to one end of said shaft, said head consisting of a conical shape and a flat bottom with said flat bottom being the site of attachment of said first head to said shaft, the conical side of said head having a sharp angle of no more than 35° with the bottom of said head whereby it would be difficult to apply a means to said head for the turning thereof; and
  (c) a second head positioned above and connected to the top of said conical shape of said first head and having a means thereon whereby a turning torque may be applied to said second head, and the connection between said first head with said second head being capable of withstanding the torque applied to said second head for the turning thereof with simultaneous turning of said first head and when said screw is torqued to a predetermined degree said connection will have insufficient strength to withstand further torque applied and said second head will be disconnected from said first head.

2. The tamper-proof screw of claim 1 in which said angle is no more than 30°.

3. The tamper-proof screw of claim 1 in which said angle is in the range of 15°-30°.

4. The tamper-proof screw of claim 1 in which said torque-turning means in said second head comprises a slot into which the tip of a screw-driver may be inserted for applying torque 5. The tamper-proof screw of claim 4 in which said angle is no more than 30°.

6. The tamper-proof screw of claim 5 in which said angle is in the range of 15°-30°.

7. The self-torquing screw of claim 1 in which the torque required to disconnect said second head from said first head is less than the torque that will damage the pertinent threaded parts engaged during installation.

8. The self-torquing screw of claim 7 in which said disconnecting torque is determined by
  a. the strength of material from which said screw is made; and
  b. the diameter of said connection located between said second head and said first head.

* * * * *